United States Patent [19]

Iwata

[11] Patent Number: 4,840,090
[45] Date of Patent: Jun. 20, 1989

[54] HARMONIC SPEED CHANGER
[75] Inventor: Masanari Iwata, Aichi, Japan
[73] Assignee: Mitsubishi Denki Kabushiki Kaisha, Aichi, Japan
[21] Appl. No.: 145,088
[22] Filed: Jan. 19, 1988
[30] Foreign Application Priority Data Jan. 19, 1987 [JP] Japan .................................. 62-9256

[51] Int. Cl.⁴ ............................................. F16H 37/00
[52] U.S. Cl. ...................................... 74/804; 901/25; 74/640
[58] Field of Search ............... 74/640, 801, 804, 805; 901/24, 25

[56] References Cited

U.S. PATENT DOCUMENTS

| 2,906,143 | 9/1959 | Musser | 74/804 |
| 3,128,641 | 4/1964 | Musser | 74/640 |
| 3,147,640 | 9/1964 | Musser | 74/640 |
| 3,444,760 | 5/1969 | Claxton | 74/640 |
| 4,398,110 | 8/1983 | Flinchbaugh et al. | 901/23 |
| 4,784,014 | 11/1988 | Bruns et al. | 74/640 |

FOREIGN PATENT DOCUMENTS 0121255  7/1984  Japan .................................. 901/25

OTHER PUBLICATIONS

Musser, The Harmonic Drive, 1960, 2-15.
Harmonic Drive Principles and Performance, 1959, 2-15.

Primary Examiner—Dirk Wright
Assistant Examiner—William Gehris
Attorney, Agent, or Firm—Sughrue, Mion, Zinn, Macpeak & Seas

[57] ABSTRACT

A harmonic speed changer mechanism includes a circular spline having an outer surface formed with a gear, a flexible spline having an outer surface formed with a gear whose number of teeth is larger than that of the circular spline and arranged outside the circular spline and a wave generator having an inner wall defining an ellipsoidal cross section and arranged outside the flexible spline. The flexible spline is deformed by the ellipse defined by the inner wall of the wave generator so that the gear of the flexible spline meshes with the circular spline gear, partially. A space is provided along an axis of the harmonic speed changer, which is enough to receive various external components necessary for a utilization device to which the harmonic speed changer is applied.

7 Claims, 4 Drawing Sheets

HARMONIC SPEED CHANGER

BACKGROUND OF THE INVENTION

The present invention relates to a harmonic speed changer for use in, particularly, an industrial machine such as an industrial robot and particularly, to such speed changer suitable for use in an articulation connecting the arms of an industrial robot.

A typical example of a conventional speed changer of this type for reducing an input rotational speed at a predetermined ratio to obtain a reduced output rotation will be described with reference to FIGS. 1 to 3, in which FIGS. 1 and 2 show a main portion of the harmonic speed changer in cross sections taken along an axis of the speed changer and a line perpendicular to the axis, respectively. As shown in these figures, an annular circular spline 1 is formed on an inner surface thereof with a gear 1a and a cylindrical flexible spline 2 is formed on an outer surface thereof with a gear 2a to be meshed with the gear 1a of the circular spline. In this case, assuming that the number of teeth of the circular spline gear 1a is (n+2), the number of teeth of the gear 2a of the flexible spline 2 is generally smaller than that of the gear 1a and may be n. Also, as is clear from FIG. 2, the flexible spline 2 takes in the form of a cylinder having a thin wall, as a whole, so that it can be resiliently deformed easily upon exertion of external force.

The conventional harmonic speed changer is further provided with a rotatable wave generator 4 having an ellipsoidal cross section. The flexible spline 2 is supported by a peripheral surface of the wave generator 4 so that the flexible spline gear 2a is resiliently deformed along the ellipse of the wave generator 4 such that only portions of the gear 2a of the flexible spline 2 which correspond to opposite ends of a long diameter portion of the wave generator 4 mesh with the circular spline gear 1a. The circular spline 1 is fixed to a utilization means by bolts extending through bolt holes 1b and an output shaft of the speed changer is fixed to the flexible spline 2 by bolts extending through bolt holes 2b.

An input shaft is inserted into the wave generator 4 through a support member 5 to transmit rotation of the input shaft to the wave generator 4. During one revolution of the wave generator 4, the gear 2a of the flexible spline 2 meshes with the gear 1a of the circular spline one by one causing $-2/n$ revolutions of the flexible spline 2, while deforming along the outer configuration of the wave generator 4. That is, in the harmonic speed changer, a reduction rate of $-2/n$ is achieved. The resultant reduced revolution is transmitted to the output shaft connected to the flexible spline 2.

FIG. 3 shows an application of such harmonic speed changer to a certain industrial device.

FIG. 3, the circular spline 1 is fixed to an edge portion of a cavity 6a of the device 6 by bolts 7. The flexible spline 2 and the wave generator 4 are arranged with respect to the circular spline 1 as shown and an input shaft 8 is inserted into the wave generator 4 through the shaft support member 5. The output shaft 9 is connected to an output side of the flexible spline 2 by means of bolts 10. The output shaft 9 is supported by the device 6 through a ball bearing 11 to prevent the output shaft 9 from moving eccentrically.

With the arrangement mentioned above, revolution of the input shaft 8 causes revolution of the output shaft 9 at reduction ratio of $-2/n$ through the harmonic speed changer having the circular spline 1, the flexible spline 2 and the wave generator 4. When the flexible spline 2 and the circular spline 1 are such that gear 1a has teeth larger in number than the gear 2a of the flexible spline 2 by two, revolution speed of the flexible spline 2 is reduced by $2/n$. The reduced revolution speed is transmitted through the output shaft 9 connected to the flexible spline 2 to another mechanism (not shown).

According to the harmonic speed changer mentioned above, the input shaft 8 of the wave generator 4 and the output shaft 9 of the flexible spline 2 must be arranged coaxially with each other. Therefore, when, for example, such harmonic speed changer is used in an articulation disposed between the arms of an industrial robot, various electrical wirings and/or hydraulic and/or oil pipings for controlling movement of the robot arms must be arranged outside of the harmonic speed changer, which means that it is necessary to provide a space large enough to arrange these wirings and/or pipings around the harmonic speed changer.

SUMMARY OF THE INVENTION

An object of the present invention is to provide a harmonic speed changer which has a compact structure allowing the necessity of large space therearound to be removed.

In the present invention, locations of a circular spline and a wave generator are reversed compared with the conventional harmonic speed changer shown in FIGS. 1 and 2. That is, a gear of the circular spline is formed on an outer peripheral surface of a cylinder body thereof onto which a flexible spline having an inner peripheral surface formed with a gear whose number of teeth is larger than that of the gear formed on the outer peripheral surface of the circular spline is fitted to establish a meshing relation between the gears. Further, the wave generator takes in the form of cylinder having an inner surface defining an ellipse in cross section and is fitted thereon to make the gear of the flexible spline deformed to an ellipsoidal shape thereby through a ball bearing means so that portions of the gear of the flexible spline which correspond to opposite ends of the minor axis of the ellipse defined by the inner wall of the wave generator meshes with the circular spline gear.

According to the present invention, when the wave generator rotates, the gear of the flexible spline meshes partially with the gear of the circular spline tooth by tooth while being deformed resiliently to transmit the rotation of the wave generator through the flexible spline with a rotation speed reduced at a preset reduction ratio.

DETAILED DESCRIPTION OF THE PREFERRED EMBODIMENT

Figure 1:
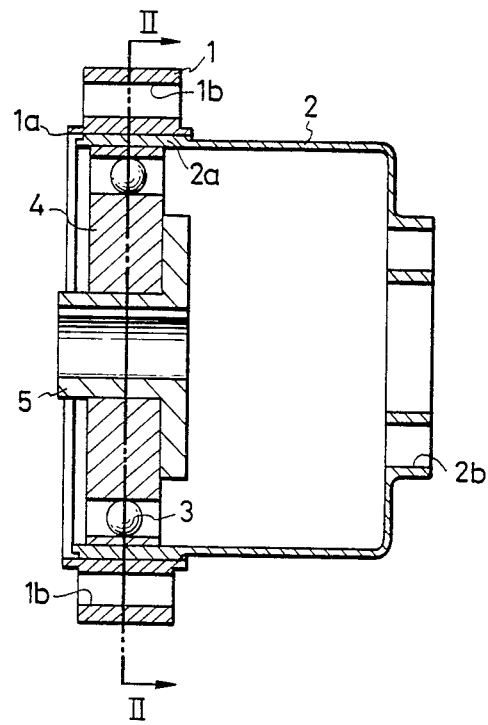
FIG. 1 is a longitudinal cross section of a conventional harmonic speed changer.
Figure 2:
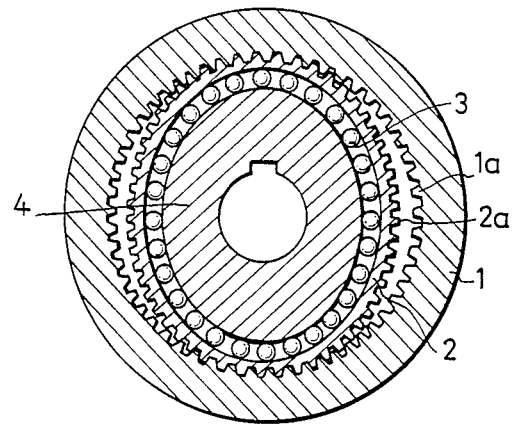
FIG. 2 is a cross section taken along a line II—II in FIG. 1.
Figure 3:
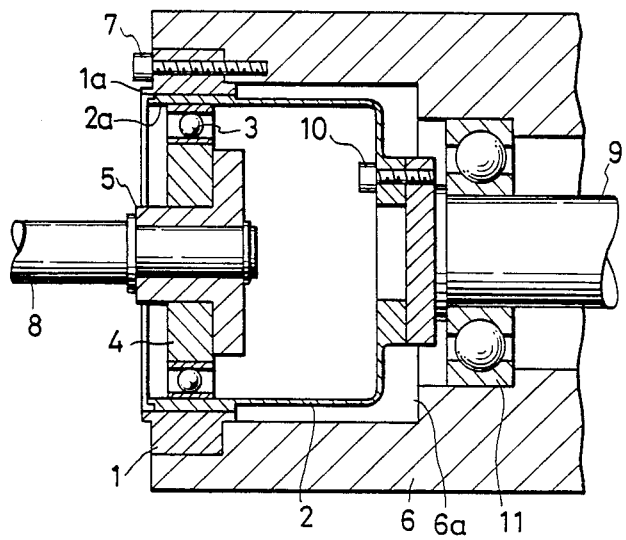
FIG. 3 is a cross section of a main portion of the conventional harmonic reduction gear mechanism when applied to a certain apparatus.

A preferred embodiment of the present invention will be described with the reference to FIGS. 4 and 5 in which same or corresponding components to those in FIGS. 1 to 3 are depicted by the same reference numerals, respectively.

Figure 4:
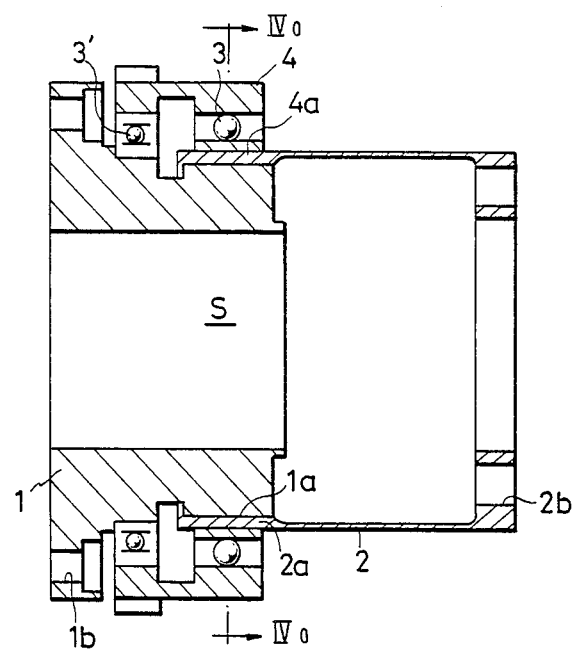
FIG. 4 is a cross section of an embodiment of a harmonic speed changer according to the present invention.
Figure 4A:
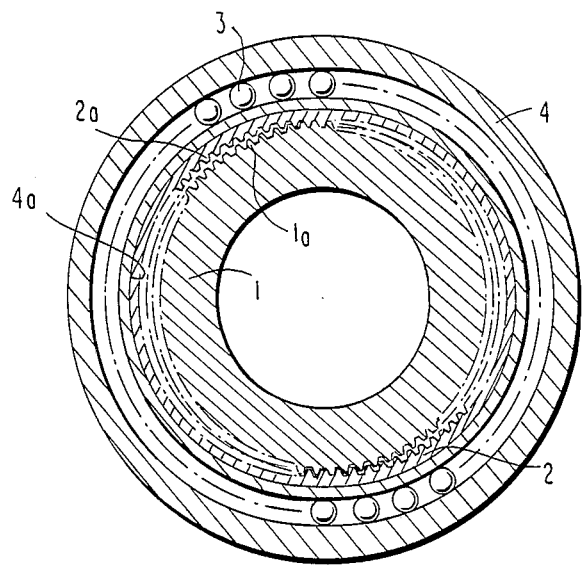

In FIG. 4 which is a cross section of the present harmonic speed changer, an arrangement of a circular spline 1 and a wave generator 4 is reversed to that in FIG. 1. In this embodiment, a gear 1a formed on an outer surface of the circular spline 1 meshes with a gear 2a formed on an inner surface of a flexible spline 2. The number of teeth of the gear 2a of the flexible spline 2 is larger than that of the gear 1a of the circular spline 1.

The wave generator 4 has an inner surface 4a which defines an ellipsoidal cross section and by which a flexible spline 2 in the form of thin walled cylinder is resiliently deformed through ball bearings 3 to conform with the ellipse. In this embodiment, the wave generator 4 is also engaged rotatably with the circular spline 1 through ball bearings 3'. As a result of the resilient deformation of the gear 2a of the flexible spline 2 due to the wave generator 4 fitted on the spline 2, the gear 2a is partially meshed with the gear 1a of the circular spline 1.

Therefore, when the wave generator 4 is rotated, the gear 2a of the flexible spline 2 advances with respect to the gear 1a of the circular spline 1 tooth by tooth peripherally, resulting in a rotation of the flexible spline 2 at a preset reduced speed with respect to the rotational speed of the wave generator 4, as in the conventional device.

Since, in this invention, the wave generator 4 is arranged in the outermost position of the reduction mechanism and the rotational dirve is not performed by an input shaft inserted into the center of the mechanism, but instead by a gear (not shown) formed on, for example, an outer peripheral surface of the wave generator 4, it is possible to provide a space S around the center axis of the reduction gear mechanism to accommodate wiring and/or piping.

Figure 5:
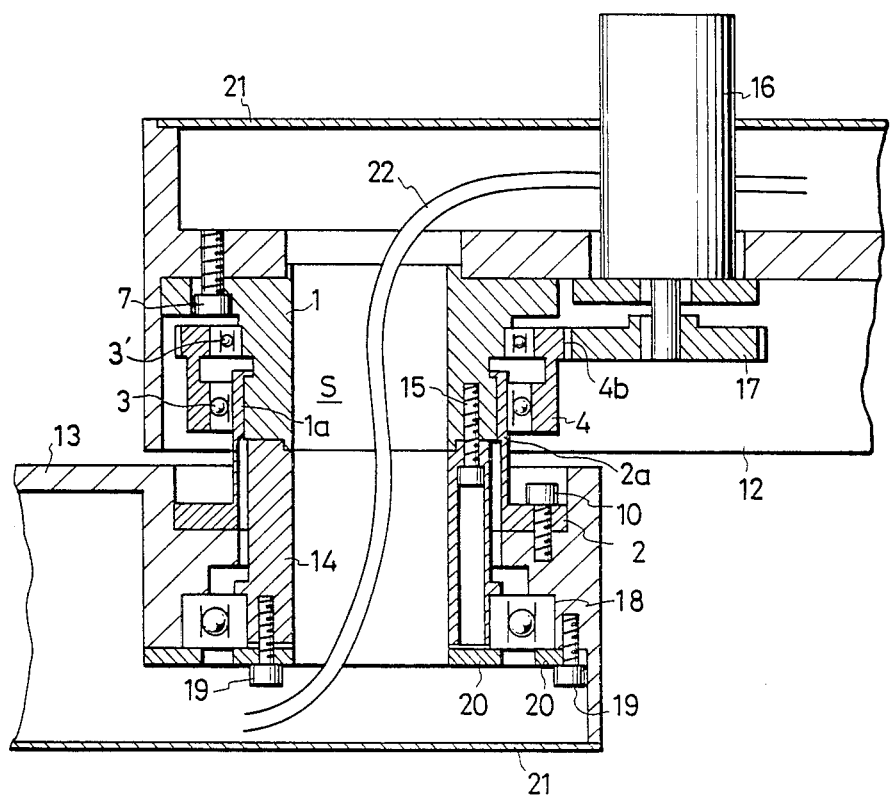
FIG. 5 is a cross section of a main portion of the embodiment in FIG. 4 when applied to an articulation of an industrial robot.

FIG. 5 shows, in cross section, the harmonic speed changer mechanism shown in FIG. 4 when applied to an articulation joint of an industrial robot, schematically.

In FIG. 5, the harmonic speed changing mechanism is arranged in the articulation between an upper arm 12 and a forearm 13 of the robot so that the forearm 13 is supported through the harmonic speed changer swingably by the articulation.

In detail, the circular spline 1 and the wave generator 4 of the reduction mechanism are arranged in the upper arm 12 and the flexible spline 2 is arranged in the forearm 13 so that axis of the respective constituents of the reduction mechanism become axial with a swinging center axis of the forearm 13.

That is, the circular spline 1 is fixed to an articulation position of the upper arm 12 by bolts 7 and the flexible spline 2 is fixed to an articulation position of the forearm 13 by bolts 10. In this embodiment, in order that weight of the forearm 13 is not exerted directly on the flexible spline 2, one end portion of a cylindrical joint 14 is connected by bolts 15 to the circular spline 1. A bearing 18 is provided on the other end portion of the cylindrical joint 14 so that a relative movement of the flexible spline 2 and forearm 13 with respect to the cylindrical joint 14 is allowed.

A gear 4b is formed on an outer peripheral surface of the wave generator 4 arranged in the upper arm 12, with which a gear 17 fixed on a shaft of a motor 16 meshes so that, upon a rotation of the motor 16, the rotational power is transmitted through the gear 17 to the wave generator 4. And, upon a rotation of the wave generator 4, the flexible spline 2 is rotated at a reduced speed for the reasons mentioned previously and hence the forearm 13 fixed to the flexible spline 2 is swung thereby.

Due to the existence of the joint 14 arranged in the forearm 13 through the bearing 18, the forearm 13 can be swung smoothly. The ball bearing 18 is fixedly supported in its position by a hold plate 20 fixed to a lower surface thereof by bolts 19. A reference numeral 21 in FIG. 5 depicts cover plates for the upper arm 12 and the forearm 13.

Since, in this embodiment, the space S is formed along the center axis of the harmonic reduction gear mechanism, the freedom in designing the articulation such as a possibility of arranging a cable 22 etc. therein is increased remarkably, thus allowing a device construction to simplify.

It may be possible to eliminate the ball bearing 3' between the circular spline 1 and the wave generator 4, if necessary, and means for transmitting rotational power to the wave generator 4 may be provided other mechanism such as pulley, chain or friction wheel than the gear mechanism.

Further, it should be noted that the ellipse defined by the inner peripheral surface of the wave generator 4 is not always necessary to be a mathematically exact ellipse. That is, it may be enough to form a curved surface which causes the gear 2a of the flexible spline 2 to mesh partially with the gear 1a of the circular spline 1.

As mentioned hereinbefore, according to the present invention, a space is provided along an axis of a harmonic reduction gear mechanism. With such space, the freedom in designing a device is greatly enhanced by using the haromonic reduction gear mechanism.

What is claimed is:

1. A harmonic speed changing mechanism arranged in an articulation between a first arm and a second arm of an industrial robot such that the second arm is supported through said harmonic speed changing mechanism swingably by the articulation, said mechanism comprising:

a circular spline fixed to said first arm of said articulation and having a cylindrical outer surface formed with a gear, a flexible spline fixed to said second arm of said articulation and having a cylindrical inner surface formed with a gear, the number of teeth of said gear of said flexible spline being larger than that of said gear of said circular spline, said flexible spline being arranged outside of said circular spline so that said gear of said circular spline can mesh with said gear of said flexible spline, and a wave generator having an inner surface defining an ellipsoidal cross section, said gear of said flexible spline being deformed to an ellipse by said inner surface of said wave generator so that said gear of said flexible spline meshes with said gear of said circular spline partially to thereby rotate said flexible spline and said second arm of said articulation at a predetermined reduction rate when said wave generator is rotated, wherein a through-hole is formed along an axis of said harmonic reduction gear mechanism and wiring and/or piping necessary for said industrial robot is provided in said through-hole.

2. The harmonic speed changer mechanism as claimed in claim 1, wherein a cylindrical joint is connected at one end to said circular spline and a bearing is provided on the other end of said cylindrical joint such that said second arm and said flexible spline are rotatably supported by said bearing on said cylindrical joint.

3. The harmonic speed changer mechanism as claimed in claim 1, wherein ball bearing means is provided between said flexible spline and said wave generator.

4. The harmonic speed changer mechanism as claimed in claim 3, wherein ball bearing means is provided between an outer radial surface of said circular spline and an inner radial surface of said wave generator.

5. The harmonic speed changer mechanism as claimed in claim 1, wherein said wave generator is driven by driving power applied to an outer radial surface thereof.

6. The harmonic speed changer mechanism as claimed in claim 5, wherein driving power for said wave generator is applied thereto through a gear formed on said outer radial surface thereof.

7. The harmonic speed changer mechanism as claimed in claim 5, wherein driving power for said wave generator is applied thereto through any of pulley, chain and frictional wheel.

* * * * *